(12) United States Patent
Story

(10) Patent No.: US 10,151,350 B2
(45) Date of Patent: Dec. 11, 2018

(54) DRIVE SHAFT SPLINT JOINT

(71) Applicant: Jason Story, Pasco, WA (US)

(72) Inventor: Jason Story, Pasco, WA (US)

( * ) Notice: Subject to any disclaimer, the term of this patent is extended or adjusted under 35 U.S.C. 154(b) by 411 days.

(21) Appl. No.: 14/256,851

(22) Filed: Apr. 18, 2014

(65) Prior Publication Data

US 2015/0300413 A1     Oct. 22, 2015

(51) Int. Cl.
*F16D 1/04*     (2006.01)
*F16D 1/05*     (2006.01)

(52) U.S. Cl.
CPC .................... *F16D 1/04* (2013.01); *F16D 1/05* (2013.01)

(58) Field of Classification Search
CPC ..... F16D 1/04; F16D 1/05; F16D 1/06; F16D 1/092; F16D 1/093; F16D 1/094; F16D 1/096; Y10T 403/7056; Y10T 403/7058; Y10T 403/7067; Y10T 403/7064; Y10T 403/7069; Y10T 403/1641
See application file for complete search history.

(56) References Cited

U.S. PATENT DOCUMENTS

| | | | | |
|---|---|---|---|---|
| 2,381,697 A | * | 8/1945 | Shepard | F16D 1/096 403/16 |
| 2,524,027 A | * | 10/1950 | Blackmarr | B60B 27/065 403/358 |
| 2,668,454 A | * | 2/1954 | Schumb | F16D 1/096 29/893.2 |
| 2,710,762 A | * | 6/1955 | Whitaker | F16D 1/096 403/16 |
| 2,835,518 A | * | 5/1958 | Naab | F16D 1/094 29/895.21 |
| 3,134,268 A | * | 5/1964 | Firth | B65G 39/02 403/238 |
| 3,257,070 A | * | 6/1966 | Kuklinski | F04D 29/263 403/247 |
| 3,638,974 A | * | 2/1972 | Stratienko | F16D 1/094 403/12 |
| 3,738,691 A | * | 6/1973 | Firth | F16D 1/096 403/370 |
| 3,893,779 A | * | 7/1975 | Schroeter | F16D 1/096 403/356 |
| 3,957,381 A | * | 5/1976 | Schafer | F16D 1/093 403/16 |
| 4,304,502 A | * | 12/1981 | Stratienko | F16D 1/094 403/370 |
| 4,364,687 A | * | 12/1982 | Adell | F16D 1/094 403/16 |
| 4,471,846 A | * | 9/1984 | Mullenberg | F16D 1/093 24/136 B |
| 4,494,889 A | * | 1/1985 | Thompson | F16D 1/096 403/16 |
| 4,525,094 A | * | 6/1985 | Johnson | F16D 1/096 403/11 |
| 4,557,621 A | * | 12/1985 | Mullenberg | F16D 1/093 403/16 |
| 4,655,630 A | * | 4/1987 | Rinehart | B23B 31/11 403/342 |

(Continued)

*Primary Examiner* — Daniel J Wiley

(57) ABSTRACT

The Drive Shaft Splint Joint is a receptacle with a tapered interior and with a drive shaft extending from the receptacle. A bushing having a tapered body is inserted into the receptacle tapered interior and the receptacle and bushing are immovably affixed with bolts. The bushing has a keyed aperture which receives a keyway drive shaft. Push bolts allow the bushing to be urged away from the receptacle allowing the drive shaft to be disassembled.

7 Claims, 6 Drawing Sheets

(56) References Cited

U.S. PATENT DOCUMENTS

| | | | | | |
|---|---|---|---|---|---|
| 4,988,231 | A | * | 1/1991 | Pettit | F16B 3/04 285/276 |
| 5,076,544 | A | * | 12/1991 | Mueller | B66D 1/30 254/266 |
| 5,174,680 | A | * | 12/1992 | Nakamura | B60B 37/04 301/111.01 |
| 5,360,283 | A | * | 11/1994 | Browning | F16D 1/095 403/261 |
| 6,065,407 | A | * | 5/2000 | Wang | A47B 57/545 108/110 |
| 6,309,136 | B1 | * | 10/2001 | Kellenberger | F16D 1/094 403/335 |
| 6,446,541 | B1 | * | 9/2002 | Eriksson | F16D 1/05 403/367 |
| 6,736,027 | B2 | * | 5/2004 | Ostling | F16D 1/094 403/374.1 |
| 7,500,543 | B2 | * | 3/2009 | Doran | B66B 11/0438 187/250 |
| 8,429,804 | B2 | * | 4/2013 | Anderson, III | F16D 1/05 29/456 |
| 8,657,544 | B2 | * | 2/2014 | Liu | F16D 1/096 411/266 |
| 8,782,866 | B2 | * | 7/2014 | Anderson, III | F16D 1/05 29/407.1 |
| 8,961,063 | B2 | * | 2/2015 | Anderson, III | F16D 1/094 285/323 |
| 2004/0096271 | A1 | * | 5/2004 | Peter | F16B 7/025 403/374.3 |
| 2009/0087258 | A1 | * | 4/2009 | McCabe | F16B 3/06 403/370 |

\* cited by examiner

DRIVE SHAFT SPLINT JOINT

FIELD OF THE INVENTION

This invention relates to a splint joint for a shaft. More specifically the invention is a splint joint for a drive shaft.

BACKGROUND OF THE INVENTION

The need to adjust, move or remove a drive shaft can facilitate repair of equipment and installation of new equipment. The ability to disassemble or separate a drive shaft or drive shaft sections can assist in repair and installation of equipment.

SUMMARY OF THE INVENTION

The Drive Shaft Splint Joint is a receptacle with a tapered interior and with a drive shaft extending from the receptacle. A bushing having a tapered body is inserted into the receptacle tapered interior and the receptacle and bushing are immovably affixed with bolts. The bushing has a keyed aperture which receives a keyway drive shaft. Push bolts allow the bushing to be urged away from the receptacle allowing the drive shaft to be disassembled.

BRIEF DESCRIPTION OF THE FIGURES

The foregoing and other features and advantages of the present invention will become more readily appreciated as the same become better understood by reference to the following detailed description of the preferred embodiment of the invention when taken in conjunction with the accompanying drawings, wherein:

FIGS. 3A and 3B are sections from FIG. 3 illustrating the bushing drive shaft aperture key (342) extending, in FIG. 3A, part way from the bushing cap top surface (326) toward the bushing cap bottom surface (328), and in FIG. 3B, from the said bushing cap top surface (326) to the bushing cap bottom surface (328).

DETAILED DESCRIPTION OF THE INVENTION

Figure 1:
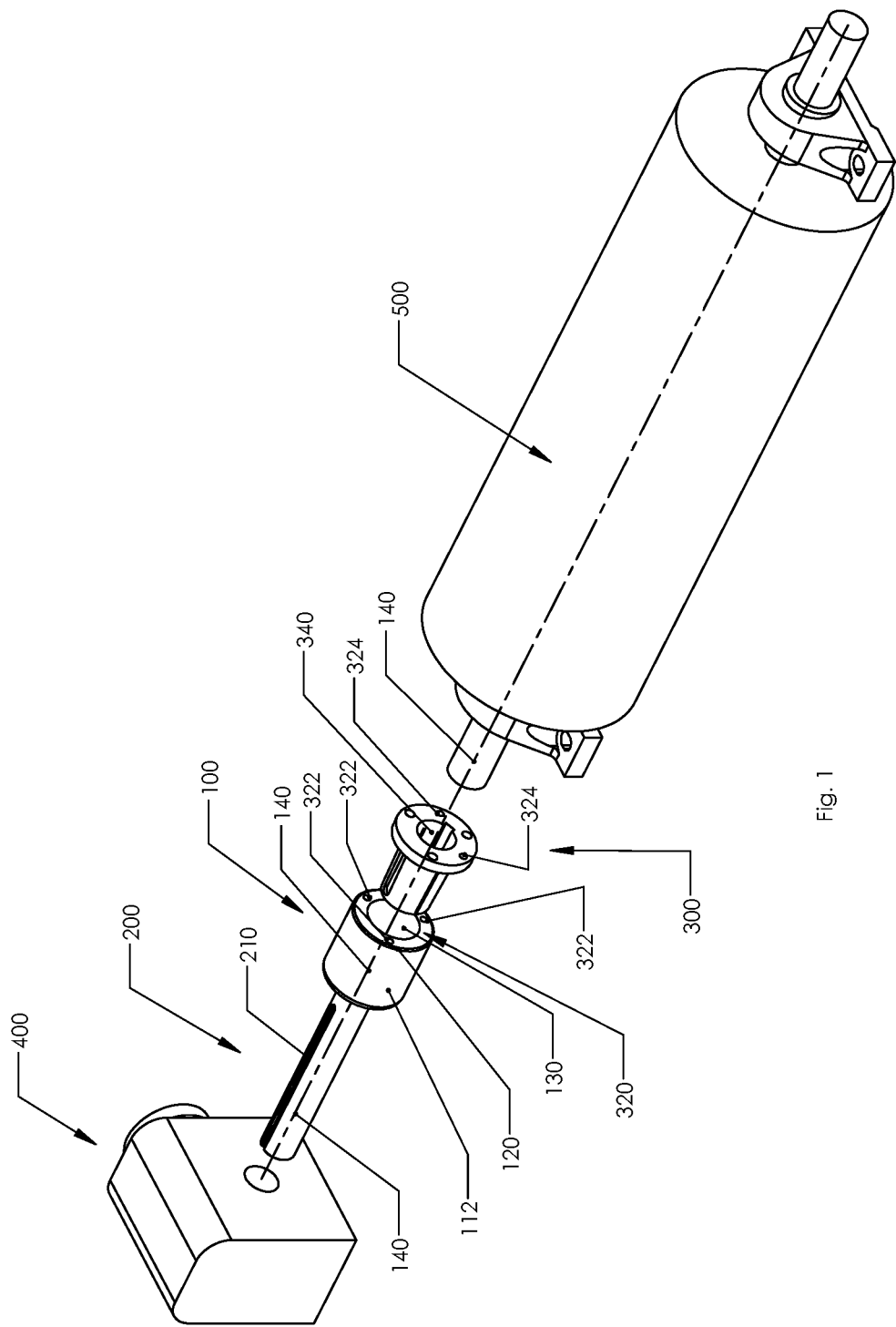
FIG. 1 illustrates a bushing receptacle (100), a drive shaft (200), a bushing (300) having a bushing cap (320), a drive device (400), a driven device (500), a driven device drive shaft (510) and a driven device drive shaft keyway (520).
Figure 2:
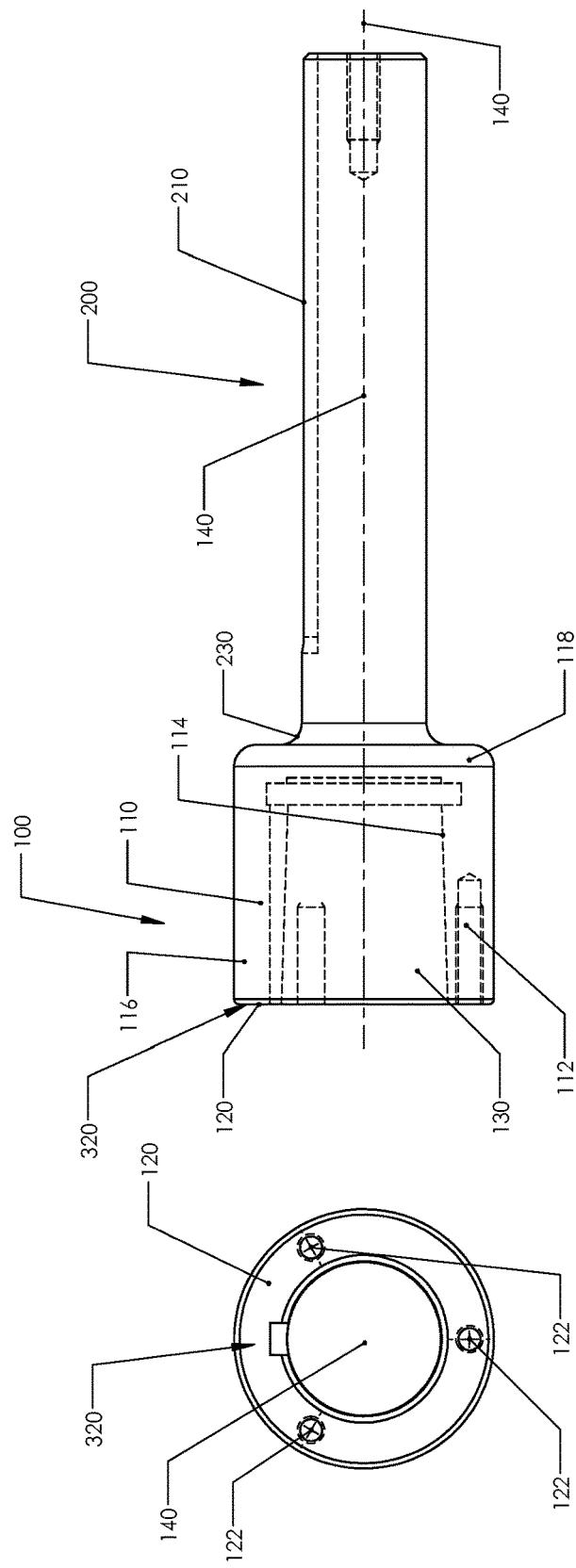
FIGS. 2 and 2A show the Splint joint (1) illustrating the bushing receptacle (100), the bushing receptacle body (110), the bushing receptacle body exterior (112), the bushing receptacle body tapered interior (114), the bushing receptacle top (116), the bushing receptacle bottom (118), the bushing receptacle mating surface (120), at least one bushing receptacle tapped hole (122), a bushing receptacle drive shaft aperture key (124) and the bushing receptacle and shaft center line (140).
Figure 2A:
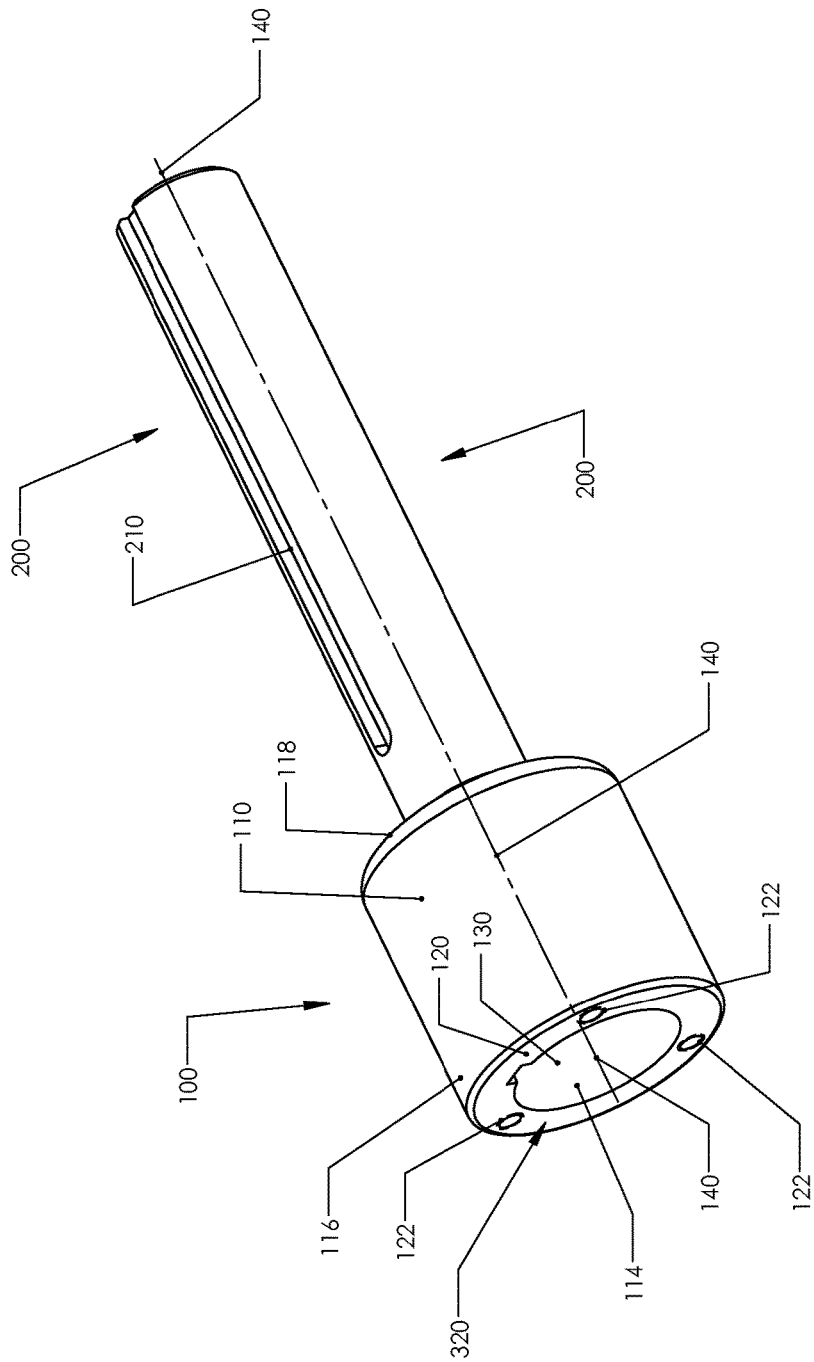
Figure 3:
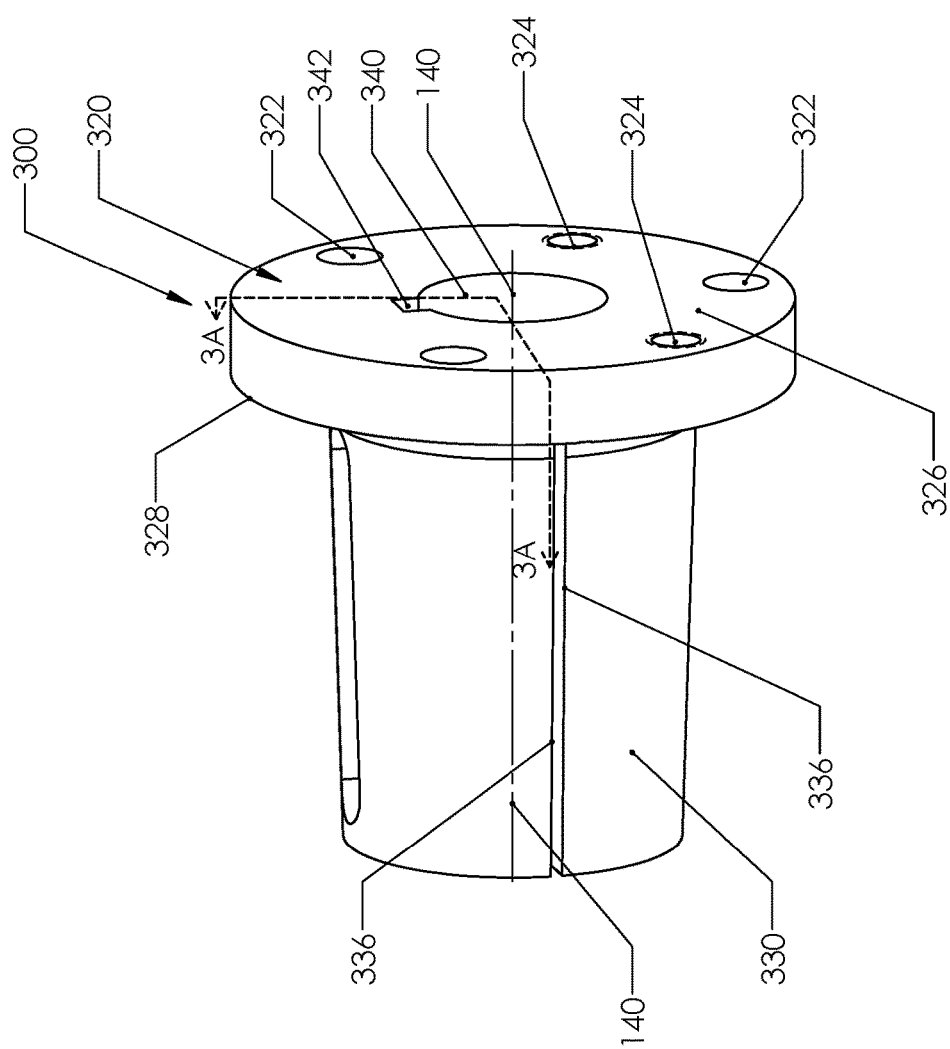
FIGS. 3, 3A and 3B shows a bushing (300), a bushing cap (320), at least one bushing cap machine bolt hole (322), at least one bushing cap push bolt tapped hole (324), and the bushing taper body split (336).
Figure 3A:
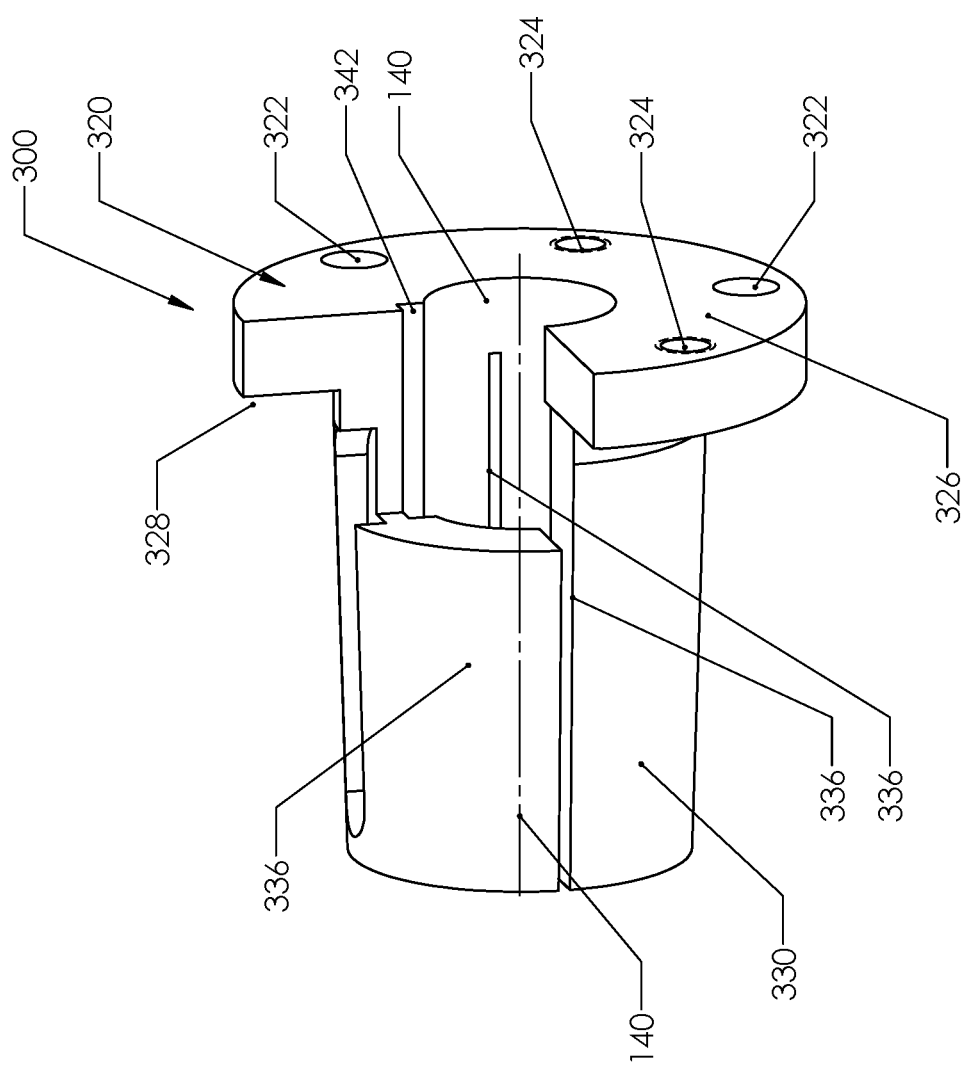
Figure 3B:
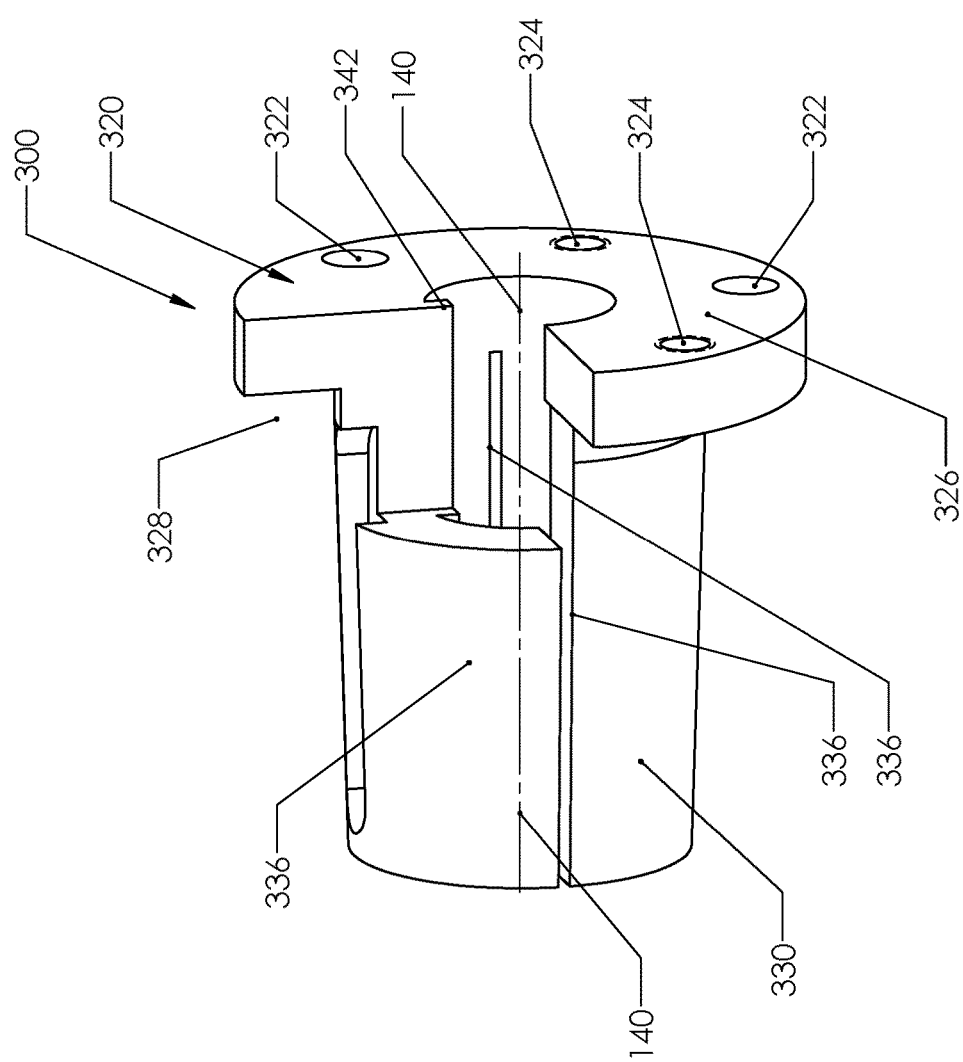

The splint joint (1) for a shaft comprises a bushing receptacle (100) having a bushing receptacle body (110); said bushing receptacle (100) having a bushing receptacle body exterior (112), a bushing receptacle body tapered interior (114), a bushing receptacle top (116), a bushing receptacle bottom (118) distal from the said bushing receptacle top (116), a generally planar receptacle bushing mating surface (120) at the said bushing receptacle top (116), at least one bushing receptacle tapped hole (122) at the said bushing mating surface (120) penetrating the said bushing receptacle body (110). A person of ordinary skill in mechanical arts will recognize that the "bushing receptacle body tapered interior (114)" may not be tapered" but that a tapered interior will provide from additional resistance to torque and rotation of the said splint joint (1) relative to an attached bushing (300).

A shaft (200) extends outwardly from and is immovably affixed, by a drive shaft connection (230), to the said bushing receptacle bottom (118). Those of ordinary skills in the drive shaft arts will understand the variety of ways that the shaft (200) may be immovably affixed to the said bushing receptacle (100) including welding. However, the preferred formation of the bushing receptacle (100) and extending shaft (200) is by machining from a single piece of rigid material including generally carbon or stainless steel. The shaft (200) is in alignment with and concentrically sharing a bushing receptacle and shaft center line (140) extending from a bushing receptacle center (140) at the said bushing receptacle interior (130).

A bushing (300) has a bushing cap (320); the bushing cap (320) having a bushing cap top surface (326) and a bushing cap bottom surface (328); said bushing cap top surface (326) and said bushing cap bottom surface (328) are generally orthogonal to the said bushing receptacle and shaft center line (140).

At least one bushing cap machine bolt hole (322) penetrates the said bushing cap (320) and is in alignment with the at least one bushing receptacle tapped hole (122). The at least one bushing cap push bolt tapped hole (324) extends from said bushing cap top surface (326) and through the said bushing cap bottom surface (328). The said at least one bushing cap push bolt tapped hole (324) is aligned to contact the said bushing mating surface (120); and a bushing drive shaft aperture (340) is sized to receive a shaft (200) and extends from said bushing cap top surface (326) through the said bushing cap bottom surface (328) and is concentrically aligned with the said bushing receptacle and shaft center line (140).

A bushing taper body (330) extends outwardly from the said bushing cap bottom surface (328); the bushing taper body (330) is sized to be slidably inserted into and extracted from the bushing receptacle body tapered interior (114); the bushing taper body (330) having a removably friction fit within the bushing receptacle body tapered interior (114); the bushing taper body (330) and the bushing receptacle body tapered interior (114) having generally the same tapered ratio; the said bushing taper body split (336) is narrow proximal the said bushing cap bottom surface (328) and is wider distal to the said bushing cap bottom surface (328). The said bushing taper body (330) has a spring function allowing the bushing taper body split (336) to close as the said bushing taper body (330) is inserted into the said bushing receptacle body tapered interior (114). In an alternative embodiment the said bushing body (330) will not be tapered. In an additional alternative embodiment there is no bushing taper body (330).

The said bushing cap bottom surface (328) is generally parallel to the said bushing receptacle mating surface (120); the at least one bushing cap machine bolt hole (322) is aligned with the said at least one bushing receptacle tapped hole (122) to receive machine screws and secure the said bushing receptacle (100) and the said bushing (300) from movement relative to the other during rotation.

The at least one bushing cap push bolt tapped hole (324) is positioned so that a threaded push bolt received by the at least one bushing cap push bolt threaded hole (324) will contact the bushing receptacle mating surface (120) and thereby urge the said bushing (300) away from and out of the said bushing receptacle (100) when the splint joint (1) disassembly is required.

In a preferred embodiment of the Splint Joint (1) the shaft (200) is a drive shaft (200) having a drive shaft key way (210); the said drive shaft (200) is driven by a drive device (400); the at least one bushing receptacle tapped hole (122) at the said bushing mating surface (120) is at least two bushing receptacle tapped holes (122); and the said at least one bushing cap push bolt tapped hole (324) is at least two bushing cap push bolt tapped holes (324) spaced apart and aligned to contact the said bushing mating surface (120); and the said bushing drive shaft aperture (340) has a bushing drive shaft aperture key (342) therein to be received into a driven device drive shaft key way (520) of a drive shaft (200) which drives a driven device (500). In the preferred embodiment the bushing drive shaft aperture key (342) extends within the said bushing drive shaft aperture (340) from the said bushing cap top surface (326) to the said bushing cap bottom surface (328). In the preferred embodiment a drive shaft (200) having a said driven device drive shaft key way (520) will extend no further into the said bushing taper body (330) than from the said bushing cap top surface (326) to the said bushing cap bottom surface (328). This preferred embodiment will allow greatest movement of the said drive shaft (200) into the said bushing taper body (330) there by facilitating disassembly of the drive shaft splint joint (1). In an alternative embodiment a drive shaft (200) having a said driven device drive shaft key way (520) will extend into the bushing cap (324) and toward the said bushing cap bottom surface (328) but will be distal to the said bushing cap bottom surface (328).

Additionally, in the preferred embodiment of the Splint Joint (1), the at least two bushing receptacle tapped holes (122) at the said bushing mating surface (120) is at least three bushing receptacle tapped holes (122) spaced equidistantly; the said at least one bushing cap push bolt tapped hole (324) is at least two bushing cap push bolt tapped holes (324) spaced apart 180 degrees.

The invention claimed is:

1. A splint joint (1) for a shaft comprising:
   a bushing receptacle (100) having a bushing receptacle body (110); said bushing receptacle (100) having a bushing receptacle body exterior (112), a bushing receptacle body tapered interior (114), a bushing receptacle top (116), a bushing receptacle bottom (118) distal from the said bushing receptacle top (116), a generally planar bushing receptacle mating surface (120) at the said bushing receptacle top (116), at least one bushing receptacle tapped hole (122) at the said bushing receptacle mating surface (120) penetrating the said bushing receptacle body (110); and
   a shaft (200) extending outwardly from and immovably affixed, by a drive shaft connection (230), to the said bushing receptacle bottom (118); said shaft (200) is in alignment with and concentrically sharing a bushing receptacle and shaft center line (140) extending from a bushing receptacle center (140) at a said bushing receptacle interior (130); and
   a bushing (300) having a bushing cap (320); the bushing cap (320) having a bushing cap top surface (326) and a bushing cap bottom surface (328); said bushing cap top surface (326) and said bushing cap bottom surface (328) are generally orthogonal to the said bushing receptacle and shaft center line (140); and
   at least one bushing cap machine bolt hole (322) penetrating the said bushing cap (320) and in alignment with the at least one bushing receptacle tapped hole (122); and
   at least one bushing cap push bolt tapped hole (324) extending from said bushing cap top surface (326) and through the said bushing cap bottom surface (328); the said at least one bushing cap push bolt tapped hole (324) is aligned to contact the said bushing receptacle mating surface (120); and
   a bushing drive shaft aperture (340) is sized to receive a shaft (200) and extends from said bushing cap top surface (326) through the said bushing cap bottom surface (328) and is concentrically aligned with the said bushing receptacle and shaft center line (140); and
   a bushing taper body (330) extends outwardly from the said bushing cap bottom surface (328); the bushing taper body (330) is sized to be slidably inserted into and extracted from the bushing receptacle body tapered interior (114); the bushing taper body (330) having a removable friction fit within the bushing receptacle body tapered interior (114);
   the bushing taper body (330) and the bushing receptacle body tapered interior (114) having generally the same tapered ratio; the said bushing taper body (330) has a spring function allowing the bushing taper body split (336) to close as the said bushing taper body (330) is inserted into the said bushing receptacle body tapered interior (114); and
   the said bushing cap bottom surface (328) is generally parallel to the said bushing receptacle mating surface (120); the at least one bushing cap machine bolt hole (322) is aligned with the said at least one bushing receptacle tapped hole (122) to receive machine screws and secure the said bushing receptacle (100) and the said bushing (300) from movement relative to the other during rotation; and
   the at least one bushing cap push bolt tapped hole (324) is positioned so that a tapped push bolt received by the at least one bushing cap push bolt tapped hole (324) will contact the bushing receptacle mating surface (120) and thereby urge the said bushing (300) away from and out of the said bushing receptacle (100) when the splint joint (1) disassembly is required.

2. A splint joint (1) for a shaft depending from claim 1 and further comprising:
   the shaft (200) is a drive shaft (200) having a drive shaft key way (210); the said drive shaft (200) is driven by a drive device (400);
   the at least one bushing receptacle tapped hole (122) at the said bushing receptacle mating surface (120) is at least two bushing receptacle tapped holes (122); and
   the said at least one bushing cap push bolt tapped hole (324) is at least two bushing cap push bolt tapped holes (324) spaced apart and aligned to contact the said bushing receptacle mating surface (120); and
   the said bushing drive shaft aperture (340) has a bushing drive shaft aperture key (342) therein to be received into a driven device drive shaft key way (520) of a drive shaft (200) which drives a driven device (500); and the said bushing drive shaft aperture key (342) extends within the said bushing drive shaft aperture (340) from the said bushing cap top surface (326) to the said bushing cap bottom surface (328).

3. A splint joint (1) for a shaft depending from claim 2 and further comprising:
   the at least two bushing receptacle tapped holes (122) at the said bushing receptacle mating surface (120) is at least three bushing receptacle tapped holes (122) spaced equidistantly; the said at least one bushing cap push bolt tapped hole (324) is at least two bushing cap push bolt tapped holes (324) spaced apart 180 degrees; and
   the said drive shaft (200) having a said driven device drive shaft key way (520) will extend into the said bushing taper body (330) from the said bushing cap top surface (326) toward the said bushing cap bottom surface (328) but will terminate distal to the said bushing cap bottom surface (328).

4. A splint joint (1) for a shaft comprising:
   a bushing receptacle (100) having a bushing receptacle body (110); said bushing receptacle (100) having a bushing receptacle body exterior (112), a bushing receptacle body interior (114), a bushing receptacle top (116), a bushing receptacle bottom (118) distal from the said bushing receptacle top (116), a generally planar receptacle bushing receptacle mating surface (120) at the said bushing receptacle top (116), at least one bushing receptacle tapped hole (122) from the said bushing receptacle mating surface (120) extending toward the said bushing receptacle bottom (118); and
   a shaft (200) is extending outwardly from and immovably affixed, by a drive shaft connection (230), at the said bushing receptacle bottom (118); said shaft (200) is in alignment with and concentrically sharing a bushing receptacle and shaft center line (140) extending from a bushing receptacle center (140) at the said bushing receptacle interior (130); and
   a bushing (300) having a bushing cap (320); the bushing cap (320) having a bushing cap top surface (326) and a bushing cap bottom surface (328); said bushing cap top surface (326) and said bushing cap bottom surface (328) are generally orthogonal to the said bushing receptacle and shaft center line (140); and
   at least one bushing cap machine bolt hole (322) extending through the said bushing cap (320) and in alignment with the at least one bushing receptacle tapped hole (122); and
   at least one bushing cap push bolt tapped hole (324) extending from said bushing cap top surface (326) and through the said bushing cap bottom surface (328); the said at least one bushing cap push bolt tapped hole (324) is aligned to contact the said bushing receptacle mating surface (120); and
   a bushing drive shaft aperture (340) is sized to receive a shaft (200) and extends from said bushing cap top surface (326) through the said bushing cap bottom surface (328) and is concentrically aligned with the said bushing receptacle and shaft center line (140); and
   the said bushing cap bottom surface (328) is generally parallel to the said bushing receptacle mating surface (120); the at least one bushing cap machine bolt hole (322) is aligned with the said at least one bushing receptacle tapped hole (122) to receive machine screws and secure the said bushing receptacle (100) and the said bushing (300) from movement relative to the other during rotation; and
   the at least one bushing cap push bolt tapped hole (324) is positioned so that a threaded push bolt received by the at least one bushing cap push bolt threaded hole (324) will contact the bushing receptacle mating surface (120) and thereby urge the said bushing (300) away from and out of the said bushing receptacle (100) when the splint joint (1) disassembly is required.

5. A splint joint (1) for a shaft depending from claim 4 and further comprising:
   the shaft (200) is a drive shaft (200) having a drive shaft key way (210); the said drive shaft (200) is driven by a drive device (400);
   the at least one bushing receptacle tapped hole (122) at the said bushing receptacle mating surface (120) is at least two bushing receptacle tapped holes (122); and
   the said at least one bushing cap push bolt tapped hole (324) is at least two bushing cap push bolt tapped holes (324) spaced apart and aligned to contact the said bushing receptacle mating surface (120); and
   the said bushing drive shaft aperture (340) has a bushing drive shaft aperture key (342) therein to be received into a driven device drive shaft key way (520) of a drive shaft (200) which drives a driven device (500); and the said bushing drive shaft aperture key (342) extends within the said bushing drive shaft aperture (340) from the said bushing cap top surface (326) to the said bushing cap bottom surface (328).

6. A splint joint (1) for a shaft depending from claim 5 and further comprising:
   the at least two bushing receptacle tapped holes (122) at the said (120) are at least three bushing receptacle tapped holes (122) equidistantly spaced; and
   and the said at least one bushing cap push bolt tapped hole (324) is at least two bushing cap push bolt tapped holes (324) spaced apart; and
   the said drive shaft (200) having a said driven device drive shaft key way (520) will extend no further into the said bushing taper body (330) than from the said bushing cap top surface (326) to the said bushing cap bottom surface (328).

7. A splint joint (1) for a shaft depending from claim 6 and further comprising:
   the at least two bushing receptacle tapped holes (122) at the said bushing receptacle mating surface (120) is at least three bushing receptacle tapped holes (122) spaced equidistantly; and
   the said bushing receptacle tapped holes (122) are parallel with the said bushing receptacle and shaft center line (140); and
   the said at least two bushing cap push bolt tapped holes (324) are spaced apart 180 degrees; and
   the bushing receptacle body interior (114) is tapered; and
   a bushing taper body (330) extends outwardly from the said bushing cap bottom surface (328); the said bushing taper body (330) is sized to be slidably inserted into and extracted from the bushing receptacle body tapered interior (114); the bushing taper body (330) having a removable friction fit within the bushing receptacle body tapered interior (114);
   the bushing taper body (330) and the bushing receptacle body tapered interior (114) having generally the same tapered ratio; the said bushing taper body (330) has a spring function allowing the bushing taper body split (336) to close as the said bushing taper body (330) is inserted into the said bushing receptacle body tapered interior (114); the bushing taper body (330) is rigidly affixed to the bushing cap bottom surface (328).

* * * * *